(12) United States Patent
Kanda

(10) Patent No.: US 8,495,706 B2
(45) Date of Patent: Jul. 23, 2013

(54) TELEVISION APPARATUS, DISPLAY CONTROL DEVICE, AND DISPLAY CONTROL METHOD

(75) Inventor: Tomohiro Kanda, Saitama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 13/111,046

(22) Filed: May 19, 2011

(65) Prior Publication Data

US 2012/0099025 A1    Apr. 26, 2012

(30) Foreign Application Priority Data

Oct. 21, 2010  (JP) ................................ 2010-236514

(51) Int. Cl.
*G06F 17/30* (2006.01)
(52) U.S. Cl.
USPC ............... 726/2; 726/14; 348/468; 348/552; 348/734; 379/93.24; 345/649; 707/706; 707/758
(58) Field of Classification Search
USPC ......... 726/2, 14; 348/468, 552, 734; 345/649; 379/93.24; 707/706, 758
See application file for complete search history.

(56) References Cited

U.S. PATENT DOCUMENTS

| | | | |
|---|---|---|---|
| 5,396,546 A * | 3/1995 | Remillard | ................... 379/93.24 |
| 6,795,130 B2 * | 9/2004 | Shibamiya | ..................... 348/734 |
| 6,834,267 B1 | 12/2004 | Fuyama | |
| 7,756,916 B2 * | 7/2010 | Shikata et al. | ................. 707/706 |
| 8,380,982 B2 | 2/2013 | Miyabayashi et al. | |
| 2006/0140175 A1 | 6/2006 | Han | |
| 2008/0016537 A1 | 1/2008 | Little et al. | |
| 2008/0039063 A1 | 2/2008 | Ichieda | |
| 2008/0160914 A1 | 7/2008 | McRae et al. | |
| 2010/0017612 A1 | 1/2010 | Aihara | |
| 2010/0082725 A1 | 4/2010 | Onishi | |
| 2010/0115052 A1 | 5/2010 | Ishii | |
| 2011/0179442 A1 | 7/2011 | Toba et al. | |

FOREIGN PATENT DOCUMENTS

| | | |
|---|---|---|
| JP | 2000-123210 | 4/2000 |
| JP | 2008-152625 | 7/2008 |
| JP | 2008-219457 | 9/2008 |
| JP | 2009-016952 | 1/2009 |

(Continued)

OTHER PUBLICATIONS

Japanese Patent Application No. 2010-236514, Notice of Rejection, mailed Aug. 23, 2011, (with English Translation).
Japanese Patent Application No. 2010-0082725, Notice of Rejection, mailed Aug. 23, 2011, (with English Translation).

(Continued)

*Primary Examiner* — Thanhnga B Truong
(74) *Attorney, Agent, or Firm* — Blakely, Sokoloff, Taylor & Zafman LLP

(57) ABSTRACT

According to one embodiment, a television apparatus includes a receiving module, a display controller, a receiving controller, an obtaining module, a storage module, and a controller. The receiving module receives an operation for putting the television apparatus into a waiting state to connect to an external device. The display controller displays identification information identifying the television apparatus, security information generated randomly, and displays screen information received from the external device. The receiving controller receives the request for connection and the security information. The obtaining module obtains external-device identification information identifying the external device if communication with the external device is initiated. The storage module stores the external-device identification information. The controller controls the display controller to display the screen information without putting the television apparatus into the waiting state if a request for communication is received from the external device.

7 Claims, 9 Drawing Sheets

FOREIGN PATENT DOCUMENTS

| | | |
|---|---|---|
| JP | 2009-212732 | 9/2009 |
| JP | 2009-217370 | 9/2009 |
| JP | 2010-021802 | 1/2010 |
| JP | 2010-041508 | 2/2010 |
| JP | 2010-081321 | 4/2010 |
| JP | 2010-098542 | 4/2010 |
| JP | 2010-114798 | 5/2010 |
| WO | WO 2004079962 | 9/2004 |

OTHER PUBLICATIONS

Japanese Patent Application No. 2011-264827, Notice of Rejection, mailed Mar. 5, 2013, (with English Translation).

European Patent Application No./Patent No. 11168322.3-2202/2445139, Extended European Search Report, mailed Aug. 22, 2012, (Applicant—Kabushiki Kaisha Toshiba, Reference No. 19094/EL).

* cited by examiner

FIG.4

| CONNECTION DESTINATION | | |
|---|---|---|
| ID | MANUFACTURER | MODEL |
| 0001 | ○○ | ○△-ZO |
| 1010 | ×△ | ○-××△△ |
| ⋮ | ⋮ | ⋮ |

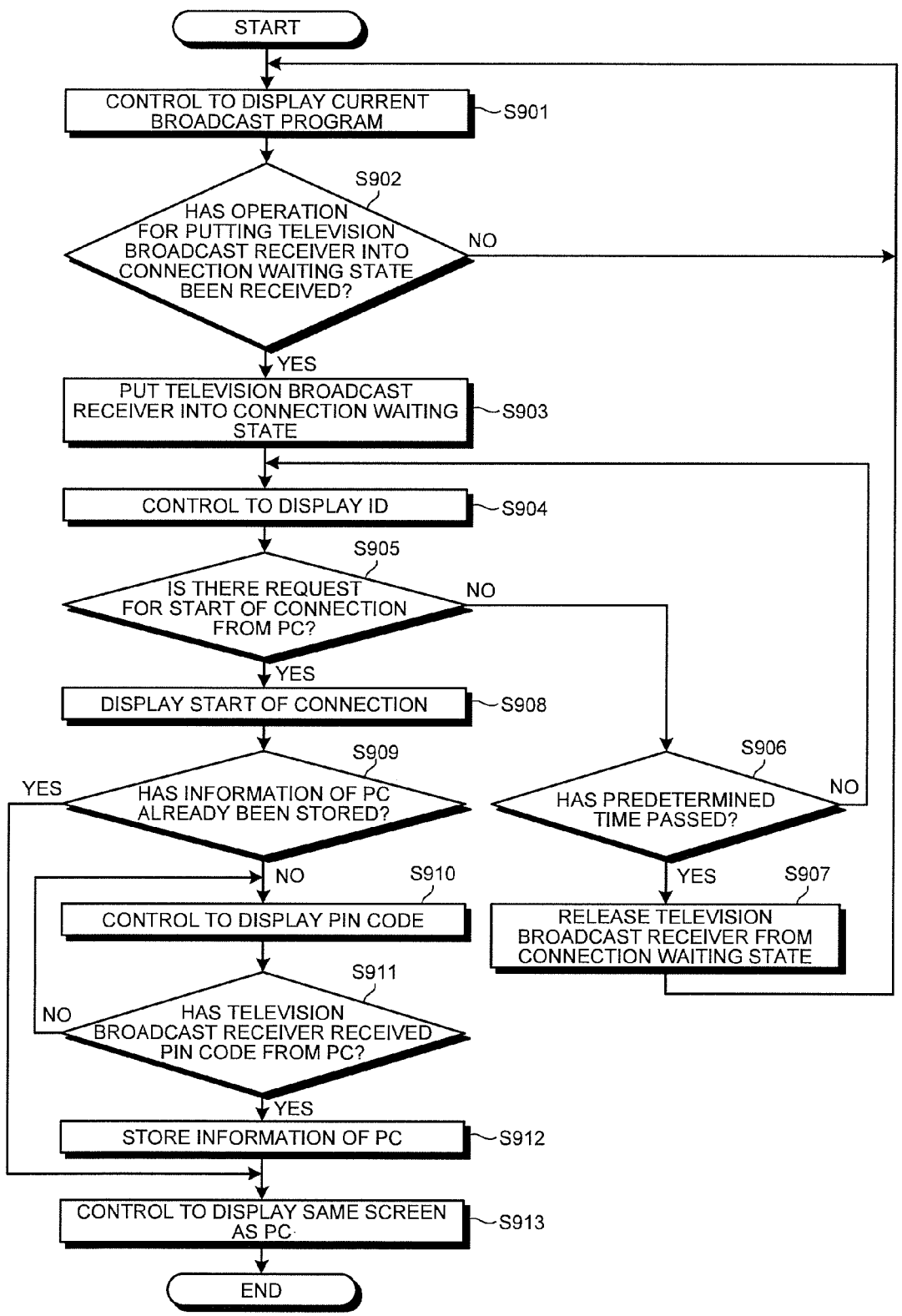

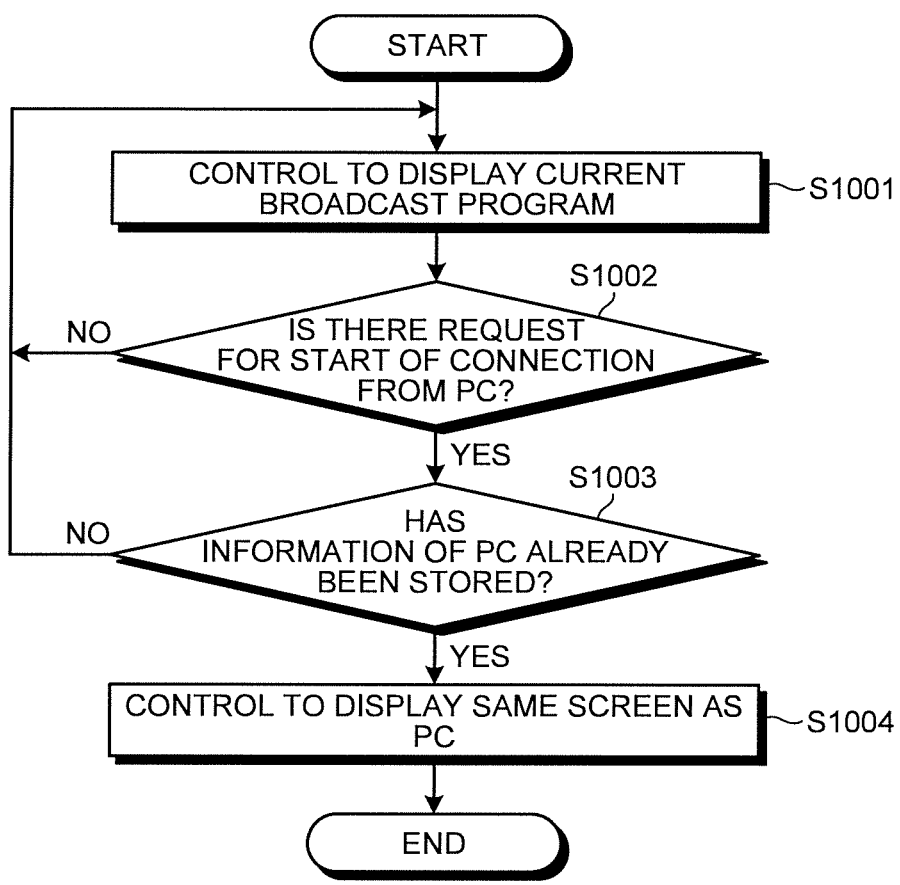

US 8,495,706 B2

TELEVISION APPARATUS, DISPLAY CONTROL DEVICE, AND DISPLAY CONTROL METHOD

CROSS-REFERENCE TO RELATED APPLICATIONS

This application is based upon and claims the benefit of priority from Japanese Patent Application No. 2010-236514, filed Oct. 21, 2010, the entire contents of which are incorporated herein by reference.

FIELD

Embodiments described herein relate generally to a television apparatus, a display control device, and a display control method.

BACKGROUND

There has been proposed a technology to display a display screen of one personal computer (PC) on another PC via wireless communication between the PCs.

In recent years, a television apparatus tends to have a high-resolution display screen and a high-performance internal processing module. With this tendency, there has been proposed a technology to display a display screen of a PC on a television apparatus via wireless communication.

In the conventional technology, if there is a plurality of television apparatuses to which a PC can be connected, a user has to select a desired television apparatus as a connection destination from them. If a PC can be connected to a television apparatus just by selection of the television apparatus on the PC side, the user may select a wrong television apparatus, i.e., one other than a desired television apparatus, by mistake.

To prevent such a wrong selection, there is a technology to receive connection with a PC only if a television apparatus, to which a user intends to connect the PC as a connection destination, is put into a state of waiting for the connection. In this case, when the television apparatus is connected to the PC, the television apparatus needs to be put into the waiting state, resulting in heavier operational load.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 4 is an exemplary diagram illustrating a list screen for selecting a connection destination television broadcast receiver on a personal computer (PC) in the embodiment;

FIG. 9 is an exemplary flowchart of a first connection process performed by the television broadcast receiver to realize a remote display in the embodiment; and FIG. 10 is an exemplary flowchart of a second or subsequent connection process performed by the television broadcast receiver to realize a remote display in the embodiment.

DETAILED DESCRIPTION

Figure 1:
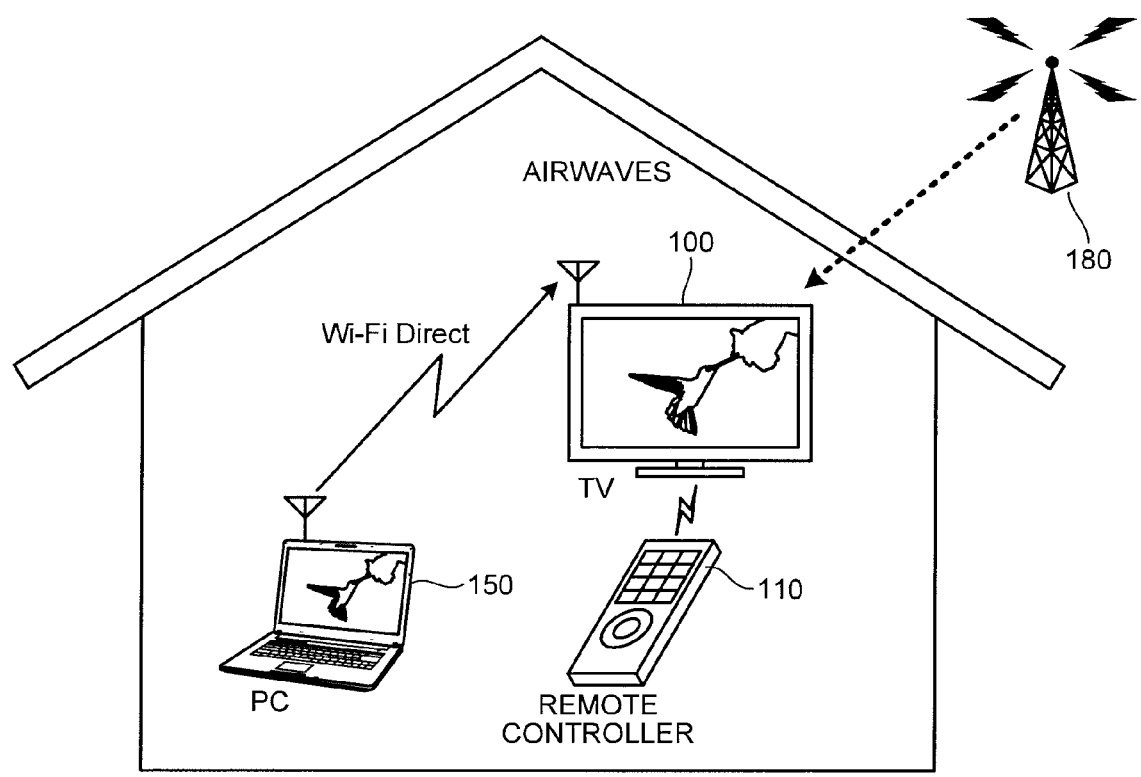
FIG. 1 is an exemplary diagram illustrating an overall framework according to an embodiment.

In general, according to one embodiment, a television apparatus comprises a receiving module, a display controller, a receiving controller, an obtaining module, a storage module, and a controller. The receiving module is configured to receive an operation for putting the television apparatus into a waiting state to connect to an external device. The display controller is configured to display identification information identifying the television apparatus when the television apparatus is put into the waiting state upon receipt of the operation by the receiving module, display security information generated randomly if a request for connection to the television apparatus identified by the identification information is received from the external device, and display screen information received from the external device if the security information is received from the external device. The receiving controller is configured to receive the request for connection and the security information from the external device. The obtaining module is configured to obtain external-device identification information identifying the external device if communication with the external device is initiated upon receipt of the security information. The storage module is configured to store the external-device identification information. The controller is configured to control the display controller to display the screen information received from the external device without putting the television apparatus into the waiting state if a request for communication is received from the external device identified by the external-device identification information stored in the storage module.

According to another embodiment, a display control device comprises a receiving module, a display controller, a receiving controller, an obtaining module, a storage module, and a controller. The receiving module is configured to receive an operation for putting the display control device into a waiting state to connect to an external device. The display controller is configured to display identification information identifying the display control device on a display module connected to the display control device when the display control device is put into the waiting state upon receipt of the operation by the receiving module, display security information generated randomly on the display module if a request for connection to the display control device identified by the identification information is received from the external device, and display screen information received from the external device on the display module if the security information is received from the external device. The receiving controller is configured to receive the request for connection and the security information from the external device. The obtaining module is configured to obtain external-device identification information identifying the external device if communication with the external device is initiated upon receipt of the security information. The storage module is configured to store the external-device identification information. The controller is configured to control the display controller to display the screen information received from the external device without putting the display control device into the waiting state if a request for communication from the external device identified by the external-device identification information stored in the storage module is received.

According to still another embodiment, a display control method applied to a television apparatus comprises: receiving an operation for putting the television apparatus into a waiting state to connect to an external device by a receiving module; displaying identification information identifying the television apparatus by a display controller when the television apparatus is put into the waiting state upon receipt of the operation at the receiving; receiving a request for connection to the television apparatus identified by the identification information from the external device by the receiving module; displaying security information generated randomly upon receipt of the request for connection by the display controller; receiving the security information from the external device by the receiving module; obtaining external-device identification information identifying the external device by an obtaining module if communication with the external device is initiated upon receipt of the security information; storing the external-device identification information in a storage module; displaying screen information received from the external device by the display controller upon receipt of the security information; and controlling the display controller to display the screen information received from the external device without putting the television apparatus into the waiting state by a controller if a request for communication is received from the external device identified by the external-device identification information stored in the storage module.

FIG. 1 is a diagram illustrating an overall framework according to an embodiment. As illustrated in FIG. 1, it is assumed, for example, that example where a television broadcast receiver 100, a remote controller 110 for operating the television broadcast receiver 100, and a personal computer (PC) 150 are present in a house. Although only one television broadcast receiver is illustrated in FIG. 1, there is a plurality of television broadcast receivers which can be connected to the PC 150.

The television broadcast receiver 100, which receives a broadcast from a broadcasting station 180 and displays the broadcast, has a function capable of displaying a display screen received from the PC 150 connected to the television broadcast receiver 100 via wireless communication. By using the function, the television broadcast receiver 100 can be switched from a state of playing a TV program to a display of the screen of the PC 150 in accordance with operations with respect to the PC 150 and the television broadcast receiver 100. In the display switching, a personal identification number (PIN) code displayed on the screen of the television broadcast receiver 100 has to be input to the PC 150.

In the present embodiment, a PIN code is a combination of numbers which is randomly generated each time the television broadcast receiver 100 displays it, and is a security code required for connection to the television broadcast receiver 100. Namely, a user inputs a PIN code displayed on the television broadcast receiver 100 to the PC 150, and the PC 150 transmits the input PIN code to the television broadcast receiver 100, thereby establishing mutual communication for a remote display.

Figure 2:
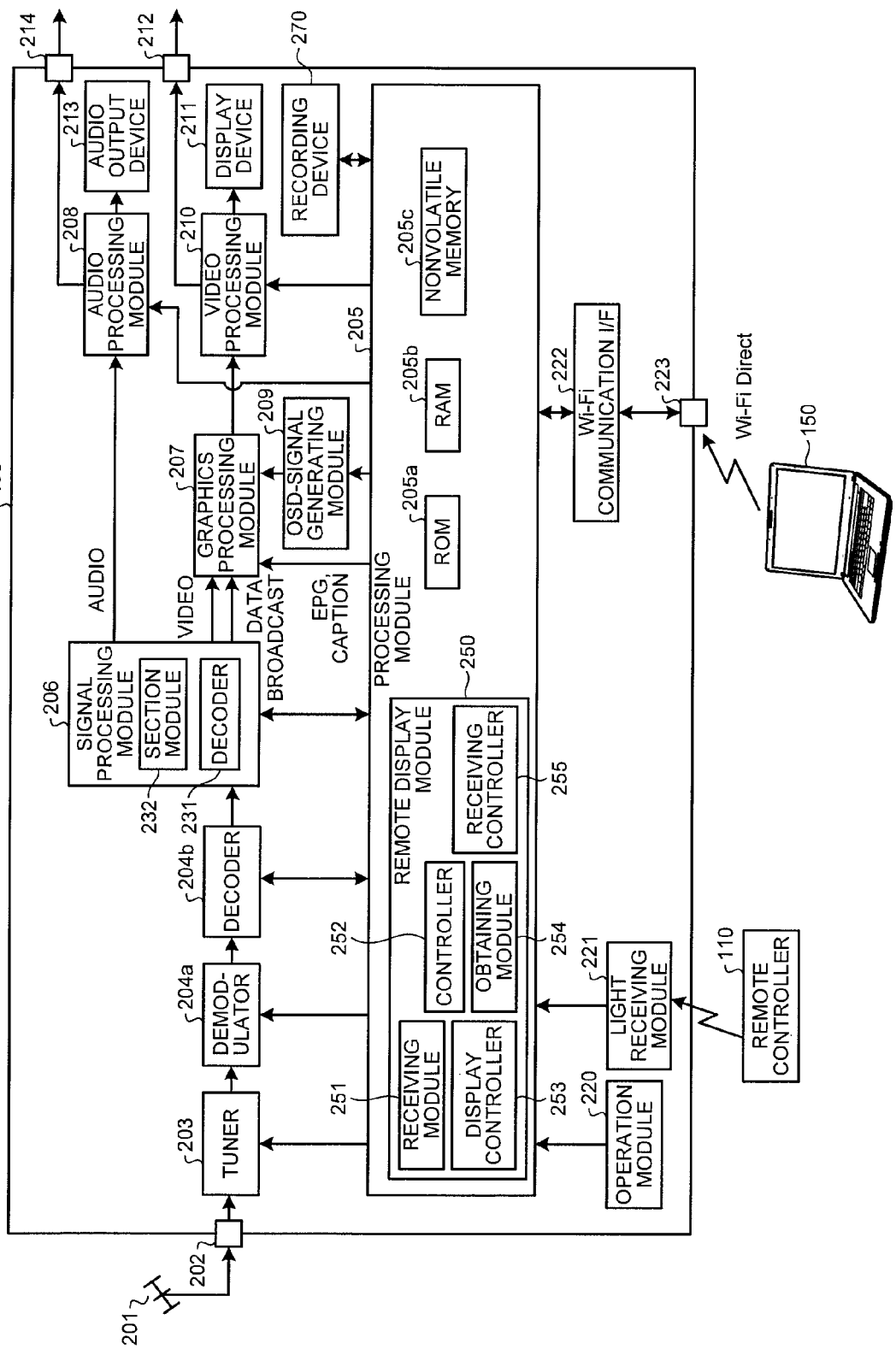
FIG. 2 is an exemplary diagram illustrating a hardware configuration of a television broadcast receiver in the embodiment.

FIG. 2 is a diagram illustrating a hardware configuration of the television broadcast receiver 100. FIG. 2 is a block diagram illustrating main signal processing systems of the television broadcast receiver 100 described above.

As illustrated in FIG. 2, a broadcast receiving antenna 201 is connected to the input side of the television broadcast receiver 100. The television broadcast receiver 100 can directly operate an external display device or audio output device, and the user can operate the television broadcast receiver 100 via an operation module (not illustrated) provided on the television broadcast receiver 100 or via the remote controller 110 with infrared communication.

The television broadcast receiver 100 decodes a received digital television broadcast signal, thereby displaying a broadcast program, and the user can watch the received broadcast program. The broadcast program can be watched with the external display device and audio output device, and the received broadcast program can be recorded.

Incidentally, the television broadcast receiver 100 illustrated in FIG. 2 may comprise a plurality of receiving circuits, such as tuners, for receiving broadcast waves.

A terrestrial digital television broadcast signal received by the terrestrial-broadcast receiving antenna 201 is supplied to a terrestrial digital broadcasting tuner 203 via an input terminal 202.

The tuner 203 selects a broadcast signal of a desired channel in accordance with a control signal from a processing module 205, and outputs the selected broadcast signal to a demodulator 204a.

The demodulator 204a demodulates the broadcast signal selected by the tuner 203 in accordance with a control signal from the processing module 205, and obtains a transport stream including the desired program, and then outputs the obtained transport stream to a decoder 204b.

The decoder 204b performs a transport stream (TS) decoding on a TS multiplexed signal in accordance with a control signal from the processing module 205, and outputs a packetized elementary stream (PES) obtained by depacketizing digital video and audio signals of the desired program to an STD buffer in a signal processing module 206. The decoder 204b outputs section information sent through a digital broadcast to a section module 232 in the signal processing module 206.

The signal processing module 206 comprises a decoder 231 and the section module 232, and performs processing of an input signal.

In TV watching, the decoder 231 selectively performs predetermined digital signal processing with respect to the digital video and audio signals supplied from the decoder 204b, and outputs the processed signals to a graphics processing module 207 and an audio processing module 208. On the other hand, in program recording, the decoder 231 selectively performs predetermined digital signal processing with respect to the digital video and audio signals supplied from the decoder 204b, and records the processed signals on a recording device 270 such as a hard disk drive (HDD) via the processing module 205.

In playback of a recorded program, the decoder 231 performs predetermined digital signal processing with respect to data of the recorded program read from the recording device 270 (for example, HDD) via the processing module 205, and outputs the processed data to the graphics processing module 207 and the audio processing module 208.

In display of a display screen of the PC 150, the decoder 231 performs predetermined digital signal processing with respect to data received from the PC 150 via the processing module 205, and outputs the processed data to the graphics processing module 207 and the audio processing module 208.

To the processing module 205, various data for obtaining a program (such as key information for B-CAS descrambling), electronic program guide (EPG) information, program attribute information (such as a category of the program), and caption information (service information (SI) and program specific information (PSI)), etc. are input from the signal processing module 206. The processing module 205 performs an image generating process to display an EPG and a caption from the input information, and outputs the generated image information to the graphics processing module 207.

The processing module 205 has a function of controlling program recording and program timer recording. Upon receipt of timer recording, the processing module 205 displays EPG information on a display device 211, and sets content of the timer recording input by the user via an operation module 220 or the remote controller 110 in a predetermined storage module. Then, the processing module 205 controls the tuner 203, the demodulator 204a, the decoder 204b, and the signal processing module 206 to record the program at the set time.

The section module 232 outputs various data for obtaining a program, EPG information, program attribute information (such as a category of the program), and caption information (SI and PSI), etc. out of the section information input from the decoder 204b to the processing module 205.

The graphics processing module 207 has a function of synthesizing (1) a digital video signal supplied from the decoder 231 in the signal processing module 206, (2) an on screen display (OSD) signal generated by an OSD-signal generating module 209, (3) image data of a data broadcast, and (4) an EPG and a caption signal which are generated by the processing module 205 and outputting the synthesized data to a video processing module 210. When a caption of a closed-captioned broadcast is displayed, the graphics processing module 207 superimposes caption information on the video signal based on the caption information under the control of the processing module 205.

A digital video signal output from the graphics processing module 207 is supplied to the video processing module 210. The video processing module 210 converts the input digital video signal into an analog video signal which can be displayed on the display device 211, and outputs the analog video signal to the display device 211 to display the video on the display device 211. The video processing module 210 can output a video signal in a format which can be displayed on an external display device (not illustrated) to the external display device via an output terminal 212 to display the video on the external display device.

The audio processing module 208 converts an input digital audio signal into an analog audio signal which can be played by an audio output device 213, and outputs the analog audio signal to the audio output device 213 to cause the audio output device 213 to play the audio. The audio processing module 208 can output an audio signal in a format which can be played by an external audio output device (not illustrated) to the external audio output device via an output terminal 214 to cause the external audio output device to play the audio.

Here, all operations of the television broadcast receiver 100, including the various receive operations described above, are controlled by the processing module 205. The processing module 205 comprises a central processing unit (CPU) and the like, and receives operation information from the operation module 220 or receives operation information sent from the remote controller 110 via a light receiving module 221, and controls the modules to reflect content of an operation (such as a channel switching operation).

In this case, the processing module 205 mainly uses a read only memory (ROM) 205a in which a control program executed by the CPU is stored, a random access memory (RAM) 205b used to provide a working area to the CPU, and a nonvolatile memory 205c, such as a flash memory, in which various setting information, control information, and program information, etc. are stored.

The processing module 205 is connected to a wireless local area network (LAN) terminal 223 via a Wi-Fi communication I/F 222. This enables the processing module 205 to transmit information to a LAN-enabled device (for example, the PC 150) connected to the wireless LAN terminal 223 via a wireless communication line through the Wi-Fi communication I/F 222.

The processing module 205 further comprises a remote display module 250. As illustrated in FIG. 2, the remote display module 250 comprises a receiving module 251, a controller 252, a display controller 253, an obtaining module 254, and a receiving controller 255.

A description will be given of a conventional procedure to start connection to a PC through the screen of a television broadcast receiver on which a TV program is currently aired and cause the television broadcast receiver to work as a remote display of the PC is explained.

Figure 3:
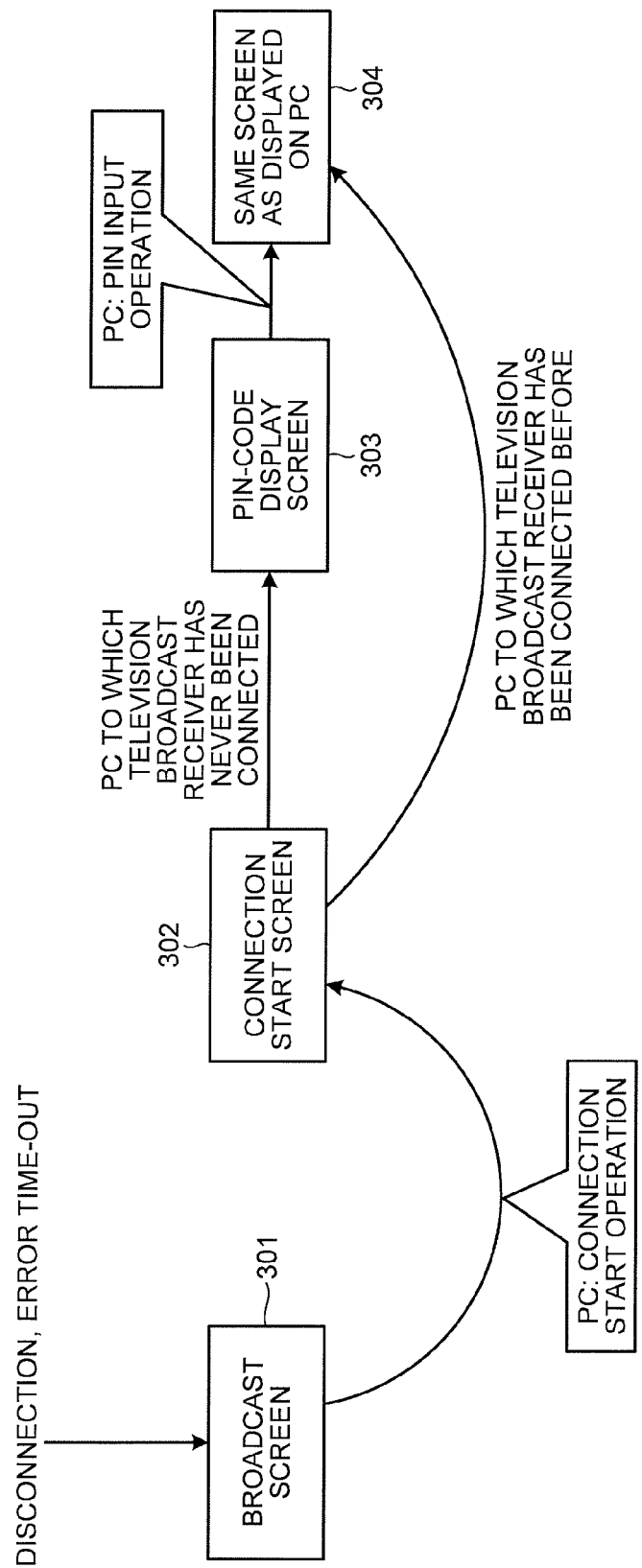
FIG. 3 is an exemplary diagram illustrating screen transition of a conventional television broadcast receiver in the embodiment.

FIG. 3 is a diagram illustrating screen transition of a conventional television broadcast receiver from when the television broadcast receiver is remotely connected to a PC till when the television broadcast receiver achieves a remote display function.

In the conventional technology, at the start of remote connection from the PC, the connection process can be completed without operating the television broadcast receiver.

In the conventional technology, first, a remote display application for realizing a remote display on the television broadcast receiver is activated on the PC side.

When the remote display application is activated, the remote display application scans a television broadcast receiver having a remote display function via wireless communication. Then, the remote display application displays a list of IDs identifying television broadcast receivers having the remote display function. Then, the remote display application receives selection of a television broadcast receiver to which screen information is to be transferred as a remote display from a user, and after that, the remote display application establishes communication for remote connection with the selected television broadcast receiver.

With the start of the communication, the display screen of the selected television broadcast receiver is switched from a broadcast screen 301 airing a broadcast to a connection start screen 302. If it is the first time the television broadcast receiver is connected to the PC, the display screen of the television broadcast receiver is further switched to a PIN-code display screen 303. A PIN code displayed on the PIN-code display screen 303 is a Wi-Fi protected setup (WPS) PIN code, and is a combination of numbers which is randomly generated in the television broadcast receiver.

When the remote display application on the PC side receives an input operation of the PIN code from the user, the remote display application issues a request for connection using the PIN code to the television broadcast receiver.

Then, when the television broadcast receiver receives communication connection using the PIN code, the television broadcast receiver displays the same screen 304 as that is displayed on the PC as a remote display of the PC.

Then, the television broadcast receiver stores information on the remote connection to the PC connected by wireless in the nonvolatile memory thereof. This allows the user to connect the PC to the television broadcast receiver without inputting the PIN code from the next time.

Therefore, when remote connection from the PC has been made before, the television broadcast receiver makes the screen transition from the connection start screen 302 to the same screen 304 as that is displayed on the PC without the screen transition from the connection start screen 302 to the PIN-code display screen 303.

In such a conventional procedure, a user has to confirm an ID identifying a connection destination television broadcast receiver in advance. If the user performs a connection operation without confirmation of the ID in advance, in a case where there is a plurality of devices accommodating a remote display, the user is more likely to select a wrong device from a list of the devices.

Namely, when there are television broadcast receivers having the function capable of connecting to the PC other than the user's home television broadcast receiver (for example, television broadcast receivers in other people's houses within a wireless accessible area), the PC recognizes a plurality of connectable television broadcast receivers. At this time, if the user selects a wrong television broadcast receiver, the television broadcast receiver in someone's house makes the screen transition to a screen for connecting to the PC (for example, the PIN-code display screen).

In this manner, the conventional television broadcast receiver illustrated in FIG. 3 automatically makes the transition from the display screen on which a TV program is currently aired to the PIN-code display screen. Therefore, if the user selects a device in a someone's house by mistake, television watching in the house may be obstructed.

To cope with such a problem, a television broadcast receiver may be configured to make the transition to a screen for connecting to the PC 150 only if a predetermined operation is performed on the television broadcast receiver and the television broadcast receiver is put into a waiting state. In this case, however, the predetermined operation is required to connect to the PC 150 each time (even if it is not the first time). In this manner, the predetermined operation is required to put the television broadcast receiver into the waiting state with each connection, so the user's operational load is increased and the user-friendliness is reduced.

Therefore, in the present embodiment, it is controlled to prevent screen transition of an unintended television broadcast receiver even if a wrong operation is performed on the PC 150 side, and the user's operational load is reduced.

The PC 150 of the present embodiment stores therein the remote display application. When the remote display application is activated, the user can select a connectable television broadcast receiver through the remote display application running on the PC 150.

FIG. 4 is a diagram illustrating an example of a list screen for selecting a connection destination television broadcast receiver from a list of connectable television broadcast receivers through the remote display application running on the PC 150. As illustrated in FIG. 4, on the list screen according to the present embodiment, a list of respective IDs, manufacturer names, and model numbers of the connectable television broadcast receivers is displayed. An ID of a television broadcast receiver here is for identifying the television broadcast receiver, and is displayed when the television broadcast receiver is put into the connection waiting state. Namely, the user visually confirms an ID displayed when a television broadcast receiver is put into the connection waiting state, and after that, the user selects the ID from a list of IDs displayed on the PC 150, so that the desired television broadcast receiver can be selected as a connection destination.

Referring back to FIG. 2, configurations of the modules in the remote display module 250 of the television broadcast receiver 100, which are components for realizing a remote display, are explained.

The receiving module 251 receives a waiting request operation for putting the television broadcast receiver 100 into the waiting state to connect to the PC 150. The waiting request operation is, for example, to press a predetermined button of the remote controller 110 or to press a button provided on the television broadcast receiver 100.

The controller 252 performs various control processes to realize a remote display. For example, when the receiving module 251 receives a waiting request operation, the controller 252 controls the television broadcast receiver 100 to be put into the connection waiting state.

The display controller 253 displays various information on the display device 211 of the television broadcast receiver 100 to realize a remote display. For example, when the receiving module 251 receives a waiting request operation and the controller 252 puts the television broadcast receiver 100 into the connection waiting state, the display controller 253 displays an ID identifying the television broadcast receiver 100 on the display device 211. The user visually confirms the displayed ID, so the user can select the ID as a connect destination through the remote display application running on the PC 150.

Figure 5:
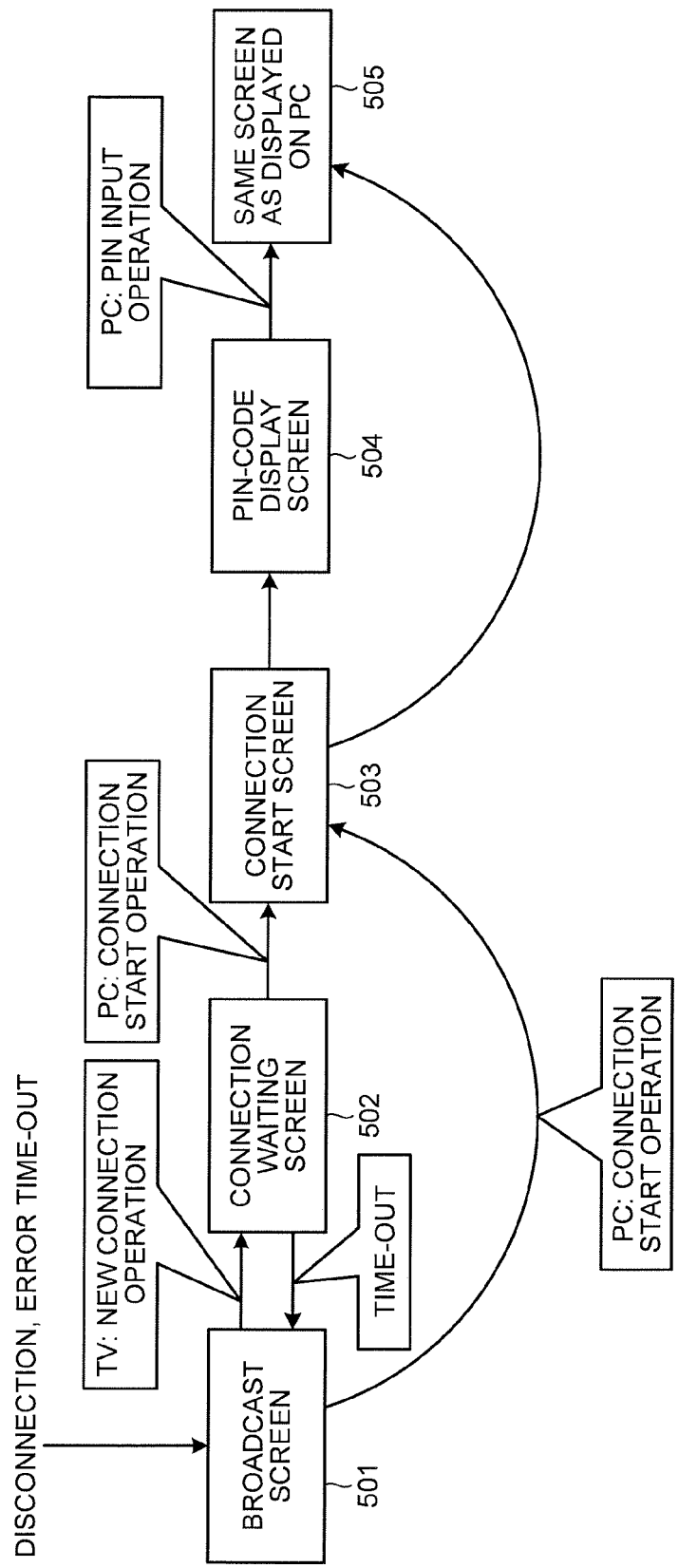
FIG. 5 is an exemplary diagram illustrating screen transition of the television broadcast receiver in the embodiment.

FIG. 5 is a diagram illustrating screen transition of the television broadcast receiver 100 according to the present embodiment. As illustrated in FIG. 5, when the receiving module 251 receives a new connection operation while the television broadcast receiver 100 displays a broadcast screen 501 airing a broadcast, the television broadcast receiver 100 is put into the connection waiting state, and the display controller 253 switches the display screen of the television broadcast receiver 100 to a connection waiting screen 502.

Figure 6:
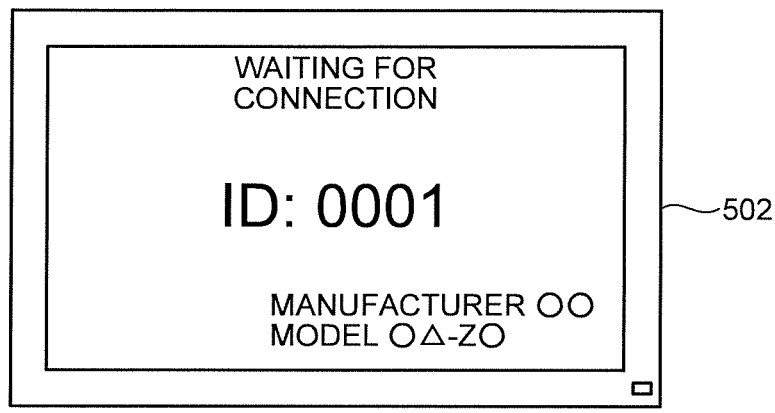
FIG. 6 is an exemplary diagram illustrating a connection waiting screen of the television broadcast receiver in the embodiment.

FIG. 6 is a diagram illustrating an example of the connection waiting screen 502. As illustrated in FIG. 6, on the connection waiting screen 502, in addition to the ID identifying the television broadcast receiver 100, a manufacturer name and a model number of the television broadcast receiver 100 are displayed. This can prevent the user from selecting a wrong ID.

Referring back to FIG. 2, when a predetermined time has passed since the television broadcast receiver 100 has been put into the connection waiting state upon receipt of the waiting request operation by the receiving module 251 (timeout), the controller 252 controls the television broadcast receiver 100 to be released from the connection waiting state. Incidentally, the predetermined time is set to an appropriate time in each embodiment in consideration for user's convenience. When it comes to time out, the display controller 253 switches the display screen of the television broadcast receiver 100 from the connection waiting screen 502 to the broadcast screen 501.

The receiving controller 255 receives various information from the PC 150 to realize a remote display. For example, the receiving controller 255 receives a connection request with respect to the television broadcast receiver 100 identified by the displayed ID from the PC 150.

Then, when the receiving controller 255 receives the connection request with respect to the television broadcast receiver 100 identified by the ID from the PC 150 while the television broadcast receiver 100 is in the connection waiting state, the display controller 253 displays a connection start screen 503 in FIG. 5. After the display of the connection start screen 503, the display controller 253 next displays a PIN-code display screen 504. A PIN code is a security code which is randomly generated to maintain the security in connection to the television broadcast receiver 100.

Figure 7:
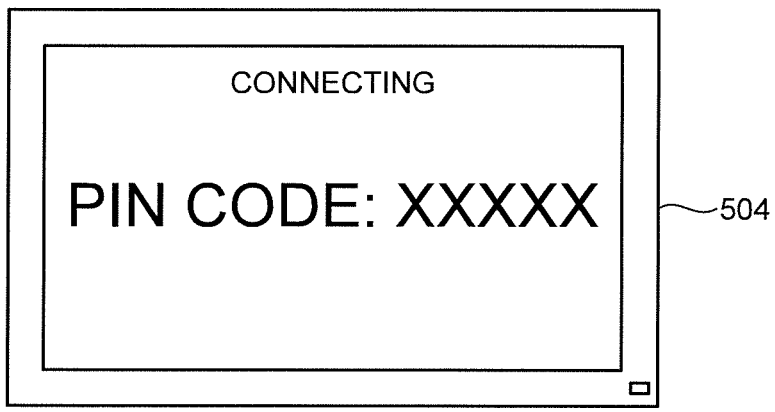
FIG. 7 is an exemplary diagram illustrating a PIN-code display screen of the television broadcast receiver in the embodiment.

FIG. 7 is a diagram illustrating an example of the PIN-code display screen 504. As illustrated in FIG. 7, on the PIN-code display screen 504, a PIN code required for connection to the television broadcast receiver 100 is displayed.

Then, the user inputs the PIN code to the remote display application running on the PC 150. After that, the PC 150 transmits the PIN code to the television broadcast receiver 100.

The receiving controller 255 receives the PIN code from the PC 150.

Then, when the receiving controller 255 has received the PIN code, communication between the PC 150 and the television broadcast receiver 100 for realizing a remote display is established, and the display controller 253 displays the same screen 505 as that is displayed on the PC 150 on the display device 211 in accordance with data transmitted from the PC 150.

Referring back to FIG. 2, when the receiving controller 255 has received the PIN code and the television broadcast receiver 100 starts communicating with the PC 150, the obtaining module 254 obtains identification information identifying the PC 150 from the PC 150. Then, the obtaining module 254 stores the obtained identification information in the nonvolatile memory 205c. The identification information identifying the PC 150 can be any information as long as the information can identify the PC 150. For example, the identification information includes a media access control (MAC) address.

Thereafter, upon receipt of a communication request from the PC 150 identified by the identification information stored in the nonvolatile memory 205c, the controller 252 establishes communication between the PC 150 and the television broadcast receiver 100 even if the television broadcast receiver 100 is not put into the connection waiting state. After that, the controller 252 controls the display controller 253 to display screen information received from the PC 150 on the display device 211.

In this manner, in the television broadcast receiver 100 according to the present embodiment, when a new PC, which is a connection source of a remote display, is registered, the controller 252 puts the television broadcast receiver 100 into the connection waiting state to register the new PC in accordance with an operation made on the remote controller 110.

When the television broadcast receiver 100 is in a state other than the connection waiting state, the controller 252 controls the television broadcast receiver 100 not to make the screen transition due to a connection request from a new PC.

Then, the controller 252 causes the connection waiting state in which a new PC can be registered to time out after the elapse of a certain period of time, and puts the television broadcast receiver 100 into a state in which a new PC cannot be registered (for example, a state in which a usual broadcast screen is displayed). Subsequently, such state transition is explained in detail.

Figure 8:
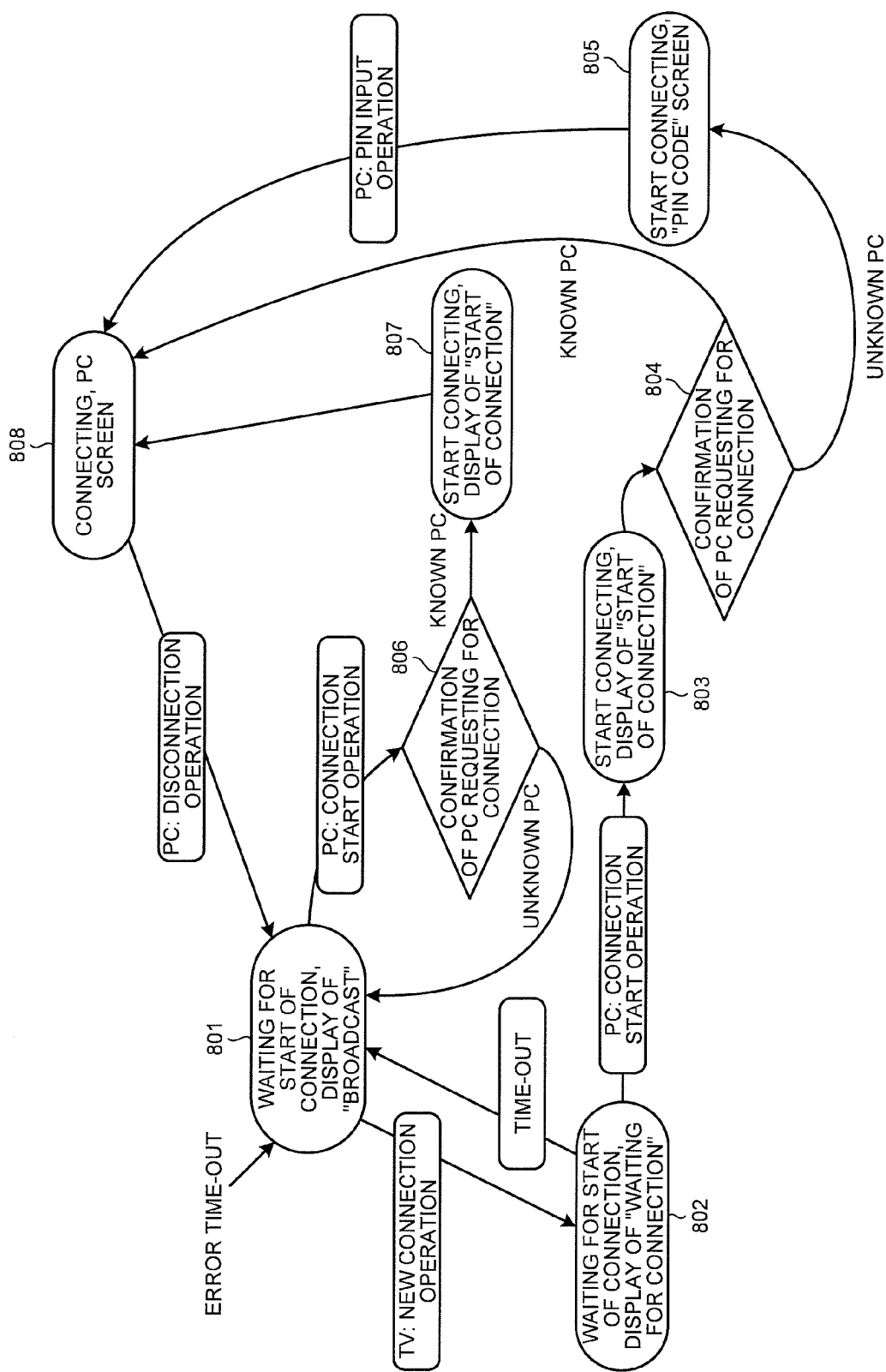
FIG. 8 is an exemplary diagram illustrating state transition of the television broadcast receiver in the embodiment.

FIG. 8 is a diagram illustrating state transition of the television broadcast receiver 100 according to the present embodiment. As illustrated in FIG. 8, a state in which the display controller 253 displays a usual broadcast screen as a connection start waiting state is referred to as a state 801. Incidentally, if an error or time-out is caused while the television broadcast receiver 100 is in other states, the television broadcast receiver 100 makes the transition to the state 801 in which a usual broadcast screen is displayed.

Then, while the television broadcast receiver 100 is in the state 801 in which the usual broadcast screen is displayed, when a connection start operation is made on a PC to cause the television broadcast receiver 100 to serve as a remote display of the PC, the PC issues a connection request to the television broadcast receiver 100. In this case, the television broadcast receiver 100 confirms whether the television broadcast receiver 100 has ever been connected to the PC, a connection requestor, based on identification information stored in the nonvolatile memory 205c (a state 806). When the PC requesting for connection is an unknown PC to which the television broadcast receiver 100 has never been connected, a process for connection is not performed, and the controller 252 maintains the television broadcast receiver 100 in the state 801 in which the usual broadcast screen is displayed.

On the other hand, when the PC requesting for connection is a known PC to which the television broadcast receiver 100 has been connected before, the television broadcast receiver 100 starts communicating with the known PC, and makes the transition to a state 807 in which the display controller 253 displays "start of connection". Then, after the communication with the PC has been established, the display controller 253 puts the television broadcast receiver 100 into a state 808 in which the same screen as that is displayed on the known PC is displayed.

When the television broadcast receiver 100 receives an input operation for connection to a new PC from the remote controller 110 while being in the state 801, i.e., displaying the usual broadcast screen, the controller 252 puts the television broadcast receiver 100 into a connection waiting state 802 for waiting for the start of connection to the new PC, and the display controller 253 displays information that the television broadcast receiver 100 is in the connection waiting state and an ID for identifying the television broadcast receiver 100 as illustrated in FIG. 6.

Then, when an input operation for the start of connection to the television broadcast receiver 100 is made on the PC, the PC transmits a connection request to the television broadcast receiver 100.

When receiving the connection request from the PC via the Wi-Fi communication I/F 222, the television broadcast receiver 100 starts connecting to the PC, and the display controller 253 displays information that the connection has been started (a state 803). After that, the controller 252 confirms whether the PC which has issued the connection request is a PC to which the television broadcast receiver 100 has ever been connected based on the identification information stored in the nonvolatile memory 205c (a state 804). When it is determined that the television broadcast receiver 100 has been connected to the PC before, after communication with the PC has been established, the television broadcast receiver 100 is put into a state 808 in which the display controller 253 displays the same screen as that is displayed on the known PC.

On the other hand, when the controller 252 has confirmed that the PC is an unknown PC to which the television broadcast receiver 100 has never been connected, the television broadcast receiver 100 is put into a state 805 in which the display controller 253 displays the PIN-code display screen. Then, when an input operation of a PIN code is made on the PC, the PC transmits the PIN code to the television broadcast receiver 100.

Then, when the television broadcast receiver 100 has received the PIN code, after establishment of communication with the PC, the controller 252 puts the television broadcast receiver 100 into the state 808 in which the display controller 253 displays the same screen as that is displayed on the unknown PC.

Subsequently, a first connection process performed by the television broadcast receiver 100 according to the present embodiment to realize a remote display of a PC (for example, the PC 150) is explained. FIG. 9 is a flowchart of the operation of the television broadcast receiver 100 according to the present embodiment.

First, the display controller 253 controls to display a current broadcast program on the television broadcast receiver 100 as a broadcast screen (S901).

Then, whether the receiving module 251 has received an operation for putting the television broadcast receiver 100 into the connection waiting state from the remote controller 110 is detected (S902). When the receiving module 251 has not received an operation for putting the television broadcast receiver 100 into the connection waiting state (NO at S902), returning to S901, the display controller 253 continuously controls to display the broadcast screen.

On the other hand, when the receiving module 251 has received an operation for putting the television broadcast receiver 100 into the connection waiting state (YES at S902), the controller 252 puts the television broadcast receiver 100 into the connection waiting state (S903). After that, the display controller 253 controls to display an ID identifying the television broadcast receiver 100 on a connection waiting screen (S904).

After that, whether the receiving controller 255 has received a request for the start of connection from the PC 150 is determined (S905). When the receiving controller 255 has not received a request for the start of connection (NO at S905), the controller 252 determines whether a predetermined time has passed (S906). When it is determined that the predetermined time has not passed (NO at S906), returning to S904, the display controller 253 continuously controls to display the ID. On the other hand, when it is determined that the predetermined time has passed (YES at S906), the controller 252 releases the television broadcast receiver 100 from the connection waiting state (S907), and the display controller 253 controls to display the current broadcast program again (S901).

When the receiving controller 255 has received a request for the start of connection from the PC 150 (YES at S905), the display controller 253 displays information that the connection is started (S908).

After that, the controller 252 determines whether identification information of the PC 150 requesting for the start of connection has already been stored in the nonvolatile memory 205c (S909). When it is determined that identification information of the PC 150 has already been stored in the nonvolatile memory 205c (YES at S909), after establishment of communication with the PC 150, the display controller 253 controls to display the same screen as the display screen of the PC 150 (S913).

On the other hand, when it is determined that identification information of the PC 150 has not been stored in the nonvolatile memory 205c (NO at S909), regarding the request from the PC 150 as a connection request from a new PC, the display controller 253 controls to display a PIN code on the screen (S910). Then, whether the receiving controller 255 has received the PIN code from the PC 150 is determined (S911). When the receiving controller 255 has not received the PIN code (NO at S911), the display controller 253 continuously controls to display the PIN code (S910).

On the other hand, when it is determined that the receiving controller 255 has received the PIN code (YES at S911), the controller 252 stores information identifying the PC 150 which has transmitted the PIN code in the nonvolatile memory 205c (S912).

Together with this, after establishment of communication with the PC 150, the display controller 253 controls to display the same screen as the display screen of the PC 150 (S913).

As described above, when connecting to the PC 150 for the first time, the television broadcast receiver 100 has to be put into the connection waiting state. Therefore, it is possible to avoid switching the screen of an unintended television broadcast receiver.

Subsequently, a second or subsequent connection process performed by the television broadcast receiver 100 according to the present embodiment to realize a remote display of a PC (for example, the PC 150) is explained. FIG. 10 is a flowchart of the operation of the television broadcast receiver 100 of the embodiment.

First, the display controller 253 controls to display a current broadcast program on the television broadcast receiver 100 as a broadcast screen (S1001).

At this time, whether the receiving controller 255 has received a request for the start of connection from the PC 150 is determined (S1002). When the receiving controller 255 has not received a request for the start of connection (NO at S1002), returning to S1001, the display controller 253 continuously controls to display the current broadcast program.

On the other hand, when the receiving controller 255 has received a request for the start of connection from the PC 150 (YES at S1002), the controller 252 determines whether identification information of the PC 150 requesting for the start of connection has already been stored in the nonvolatile memory 205c (S1003). When it is determined that identification information of the PC 150 has not been stored in the nonvolatile memory 205c (NO at S1003), returning to S1001, the display controller 253 continuously controls to display the current broadcast program.

On the other hand, when the controller 252 determines that identification information of the PC 150 has already been stored in the nonvolatile memory 205c (YES at S1003), after establishment of communication with the PC 150, the display controller 253 controls to display the same screen as the display screen of the PC 150 (S1004).

As described above, when connecting to the PC 150 for the second or subsequent time, the television broadcast receiver 100 does not have to be put into the connection waiting state; therefore, it is possible to reduce the user's operational load.

When having not received an operation for putting the television broadcast receiver 100 into the connection waiting state through the remote controller 110, the television broadcast receiver 100 does not receive a request for the start of connection for a remote display from a new PC. If the television broadcast receiver 100 receives the request, the request is treated as an error. The television broadcast receiver 100 can store information on the error in the nonvolatile memory 205c.

In the television broadcast receiver 100 according to the present embodiment, if there is no request for connection from a PC in a certain period of time since the television broadcast receiver 100 has been put into the connection waiting state upon receipt of an operation for putting the television broadcast receiver 100 into the connection waiting state through the remote controller 110, as time-out processing, the television broadcast receiver 100 makes the transition to the original state (for example, a display screen of a current broadcast program). By such time-out transition, the possibility of unintended screen transition due to a wrong connection request can be reduced.

In the present embodiment, there is described the case where an external device connected to the television broadcast receiver 100 is the PC 150. However, the external device is not limited to the PC 150; for example, the external device can be a mobile device, such as a cellular phone unit.

In the above embodiment, there is described an example in which the television broadcast receiver 100 realizes a remote display. However, a device realizing the remote display is not limited to a television broadcast receiver, and the device may be a set-top box connected to a display. As a modification of the embodiment, an example of a set-top box is explained.

The set-top box according to the modification has basically the same configuration as the television broadcast receiver 100 in the embodiment except the display device 211 in the example illustrated in FIG. 2. The set-top box further comprises an interface for connecting the set-top box to a display. The interface includes, for example, a high-definition multimedia interface (HDMI). The set-top box is connected to an external display via the interface, and controls to display such as a screen of a terrestrial digital broadcasting program on the display.

Moreover, by using a wireless LAN terminal and a Wi-Fi communication I/F, the set-top box can transmit and receive information to/from a PC connected to the set-top box via a wireless communication line.

Furthermore, the set-top box can receive a connection request from the PC, and can control to display the same screen as the PC on the display. The control up to the display control is identical to that is in the embodiment, and the description of the control is omitted.

While, in the present modification, the example of the set-top box is described, any other display control devices may realize a remote display as long as the display control device is connected to a display device, such as a display, via an external interface.

As described above, according to the embodiment and the modification, in connection to a new PC, only if a device receives an operation for putting the device into a connection waiting state through an operation module, such as the remote controller 110, in advance, the device receives a connection request from the new PC. Therefore, even if a wrong device is selected as a connection destination, it is possible to prevent screen transition of the wrong device. Furthermore, in second or subsequent connection to the PC, the operation for putting the device into the connection waiting state is not required; therefore, it is possible to reduce the operational load. Namely, according to the embodiment and the modification, it is possible to achieve simultaneous pursuit of ensuring of the security by prevention of screen transition of a wrong device and reduction of the operational load.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display controller including software executable by a processor, the display controller comprising:
   a first display controlling module that, when executed by the processor, displays video of a broadcast program on a display screen;
   a first receiving module that, when executed by the processor, receives an operation;
   a second display controlling module that, when executed by the processor, displays security information on the display screen upon the receipt of the operation by the first receiving module;
   a second receiving module that, when executed by the processor, receives, from an external device to which the security information is input, the security information and identification information identifying the external device, after the security information is displayed;
   a storage module configured to store therein the received identification information;
   a third receiving module that, when executed by the processor, receives a request for connection from the external device, while the video of the broadcast program is displayed on the display screen;
   a fourth receiving module that, when executed by the processor, receives the screen information from the external device, if the received request for connection is sent from the external device identified by the identification information stored in the storage module; and
   a third display controlling module that, when executed by the processor, displays the received screen information on the display screen if the received request for connection is sent from the external device identified by the identification information stored in the storage module, and to continue displaying the video of the broadcast program if the received request for connection is not sent from the external device identified by the identification information stored in the storage module.

2. The display controller of claim 1, wherein the second display controlling module that, when executed by the processor, switches to display the video of the broadcast program by the first display controlling module when a predetermined time has passed since the display of the identification information is started upon receipt of the operation by the first receiving module.

3. The display controller of claim 1, further comprising a display module comprising the display screen.

4. A display controller comprising:
   a first display controlling module that, when executed by the processor, displays video of a broadcast program on a display screen;
   a first receiving module that, when executed by the processor, receives an operation for putting the display controller into a waiting state to connect to an external device;
   a second display controlling module that, when executed by the processor, displays first identification information identifying the display controller on the display screen upon receipt of the operation for putting the display controller into the waiting state by the first receiving module;
   a second receiving module that, when executed by the processor, receives a first request for connection sent to the display controller identified by the first identification information from the external device which obtained the displayed first identification information, while the first identification information is displayed;
   a third display controlling module that, when executed by the processor, displays security information on the display screen when the first request for connection is received while the first identification information is displayed;
   a third receiving module that, when executed by the processor, receives the security information, screen information, and second identification information identifying the external device from the external device to which the security information is input and in which the security information is processed, after the security information is displayed;
a fourth display controlling module that, when executed by the processor, displays, on the display screen, the screen information received from the external device which sent the security information, upon receipt of the displayed security information; and
a storage module configured to store therein the received second identification information, wherein
the second receiving module that, when executed by the processor, further receives the second request for connection from the external device when the video of the broadcast program is displayed on the display screen as well as when the first identification information is not displayed,
the third receiving module that, when executed by the processor, is configured to further receives the screen information from the external device when the received second request for connection is sent from the external device identified by the second identification information stored in the storage module, and
the fourth display controlling module that, when executed by the processor, further displays the received screen information on the display screen if the received second request for connection is sent from the external device identified by the second identification information stored in the storage module, and to continue displaying the video of the broadcast program if the received second request for connection is not sent from the external device identified by the second identification information stored in the storage module.

5. The display controller of claim 4, further comprising a display module comprising the display screen.

6. A display control method comprising:
displaying, by a display controlling module, video of a broadcast program on a display screen;
receiving, by a first receiving module, an operation;
displaying, by the display controlling module, security information on the display screen upon receipt of the operation by the first receiving module;
receiving, by a second receiving module, from an external device to which the security information is input, the security information and identification information identifying the external device, upon displaying of the security information
storing the received identification information in a storage module;
receiving, by the second receiving module, a request for connection from the external device while the video of the broadcast program is displayed on the display screen;
receiving, by the second receiving module, the screen information from the external device, if the received request for connection is sent from the external device identified by the identification information stored in the storage module; and
displaying, by the display controlling module, the received screen information on the display screen if the received request for connection is sent from the external device identified by the identification information stored in the storage module, and continue displaying the video of the broadcast program if the received request for connection is not sent from the external device identified by the identification information stored in the storage module.

7. The display control method of claim 6, wherein the displaying of the security information switches to the displaying of the video of the broadcast program when a predetermined time has passed since the displaying of the identification information is started upon receipt of the operation by the first receiving module.

* * * * *